United States Patent
Beck et al.

[11] Patent Number: 5,098,173
[45] Date of Patent: Mar. 24, 1992

[54] ANTI-LOCKING HYDRAULIC BRAKE SYSTEM

[75] Inventors: Erhard Beck, Darmstadt; Harald Luetteke, Rosbach, both of Fed. Rep. of Germany

[73] Assignee: Alfred Teves GmbH, Frankfurt, Fed. Rep. of Germany

[21] Appl. No.: 572,993

[22] PCT Filed: Nov. 20, 1989

[86] PCT No.: PCT/EP89/01405
§ 371 Date: Aug. 9, 1990
§ 102(e) Date: Aug. 9, 1990

[87] PCT Pub. No.: WO90/06873
PCT Pub. Date: Jun. 28, 1990

[30] Foreign Application Priority Data

Dec. 19, 1988 [DE] Fed. Rep. of Germany ....... 3842699
Jul. 6, 1989 [DE] Fed. Rep. of Germany ....... 3922082

[51] Int. Cl.⁵ .................................. B60T 8/40
[52] U.S. Cl. ......................... 303/116 R; 303/DIG. 2; 303/DIG. 6
[58] Field of Search ............... 303/11, 116, 119, 113, 303/DIG. 1, DIG. 2; 251/282

[56] References Cited

U.S. PATENT DOCUMENTS

| | | | |
|---|---|---|---|
| 4,685,749 | 8/1987 | Otsuki et al. | 303/119 X |
| 4,708,407 | 10/1987 | Maehara | 303/119 X |
| 4,750,789 | 6/1988 | Belart et al. | 303/119 X |
| 4,790,608 | 12/1988 | Burgdorf et al. | 303/116 X |
| 4,865,348 | 4/1989 | Takeuchi et al. | 303/119 X |
| 4,957,330 | 9/1990 | Morikawa et al. | 303/119 X |

FOREIGN PATENT DOCUMENTS 61-282158  6/1985 Japan .
2183763 12/1986 United Kingdom .

Primary Examiner—Robert J. Oberleitner
Assistant Examiner—Lee W. Young
Attorney, Agent, or Firm—Robert P. Seitter; J. Gordon Lewis

[57] ABSTRACT

The pressure in the wheel brake of the system is controlled by an inlet valve 15 and an outlet valve 17 activated in response to the system controls. Fluid pressure from the pumps 13, is supplied to the wheel brake through the inlet valve 15, and discharged from the wheel brake through the outlet valve 17. By inserting a differential pressure limiter valve ahead of the inlet valve 15, the noise generated by the inlet valve is substantially reduced. A valve body 45 carries both the limiter valve seat and a discharge check valve seat, and respective closure balls 61, 62.

8 Claims, 3 Drawing Sheets

ANTI-LOCKING HYDRAULIC BRAKE SYSTEM

BACKGROUND OF THE INVENTION

The present invention relates to an anti-locking hydraulic brake system comprising at least one wheel brake and an auxiliary pressure source, with an inlet valve being inserted into the conduit between the auxiliary pressure source and the wheel brake and an outlet valve connected to the return conduit.

A brake system of this type is disclosed, for example, in German patent document DE-OS 36 27 000 which discloses a dual-circuit brake system comprising a tandem master cylinder and a pump for each brake circuit. The wheel brake cylinders, through respective inlet valves, are each in communication with the pressure conduit leading to the pump, and with the brake circuit leading to the master brake cylinder, respectively, and, through an outlet valve, to the return conduit leading to the reservoir. The inlet valve is normally opened, while the outlet valve is normally closed.

During a deceleration process, the rotation of the wheels is permanently monitored. If one of the wheels tends to lock, the pump drive is actuated, and the inlet and outlet valves of the wheel tending to lock are excited such that a pressure is adjusted in the wheel brakes correlating with the optimum slip value of the wheel. For lowering the pressure, the outlet valve is opened and the inlet valve closed, while, for maintaining the pressure, both valves are closed, and, for increasing the pressure, the inlet valve is opened and the outlet valve closed.

The inlet and outlet valves are electromagnetically excited valves comprising a closure member seated on a valve seat. During an anti-locking-controlled deceleration operation, on the valves, a pressure gradient occurs in the brake fluid resulting in control noises causing annoying the driver of the automotive vehicle. It is, therefore, an object of the present invention to substantially decrease the control noises on the valve.

SUMMARY OF THE INVENTION

The underlying problem is solved in accordance with the present invention in that a differential pressure limiter is inserted between the auxiliary pressure source and the inlet valve, whereby a brake fluid pressure exceeding the pressure corresponding to the force of a valve spring is relieved, to cause a defined constant pressure gradient on the inlet valve determined by the valve spring. Such a pressure gradient may be adjusted to, for example, 25 bar which is thus substantially lower than the pressure gradient usually occurring with a panic anti-locking-controlled deceleration in the brake system according to the afore-mentioned German patent document. It has been found that the control noises increases with an increasing pressure gradient, being particularly noisy once the driver, in a panic deceleration, applies full force to the brake pedal. If this occurs at a lower locking level (frozen roads) maximum pressure gradients exist that cause maximum control noises which will particularly affect the inlet valve. Lowering the pressure gradient on the inlet valve, substantially reduces control noises.

Another recognized advantage that is provided by the present invention resides in that the algorithm for controlling the valves can be substantially simplified. Due to the firmly adjusted pressure gradient on the inlet valve, the flow volume flowing through gradient on the inlet valve, the flow volume flowing through the valve per unit of time is precisely fixed. The pressure increase on the wheel brakes to be expected is, therefore, known. Complex calculations for fixing the opening time of the valve can be eliminated in the control algorithm. The pressure gradients on the inlet valve thus maintained constant during the control, in addition to the lower control noise, involve three other notable advantages as follows: (a) reduced stopping distance; (b) improved quality control by increasing the control frequency, and, (c) reduced brake fluid consumption with the consequence of an enhanced brake reserve n deceleration processes on surfaces exhibiting suddenly changing frictional values.

A space-saving arrangement of the differential pressure limiter results in that the housing of the control valve is directly connected to the valve block for the inlet and outlet valves, and that the housing of the differential pressure limiter is integrally formed with the valve block, respectively. In order to attain a compact arrangement of the required valves, that is of the differential pressure limiter and of the check valve, with the valve components being so arranged that the same can be easily manufactured, a valve body carries both the valve seat of the differential pressure limiter and the valve seat of the check valve. A particularly simple embodiment is attained if the valve body carrying the two valve seats is sealingly guided in the longitudinal bore of a housing and defines a central chamber accommodating the valve balls. Since the requirements placed upon the denseness of the valve seat of the check valve are not very high the sealing seat may be formed on an insert inserted into the valve body. This construction also enables the valve seat of the differential pressure limiter to be easily manufactured.

BRIEF DESCRIPTION OF THE DRAWINGS

The invention will now be described in greater detail with reference to the accompanying drawing wherein.

DETAILED DESCRIPTION

Figure 1:
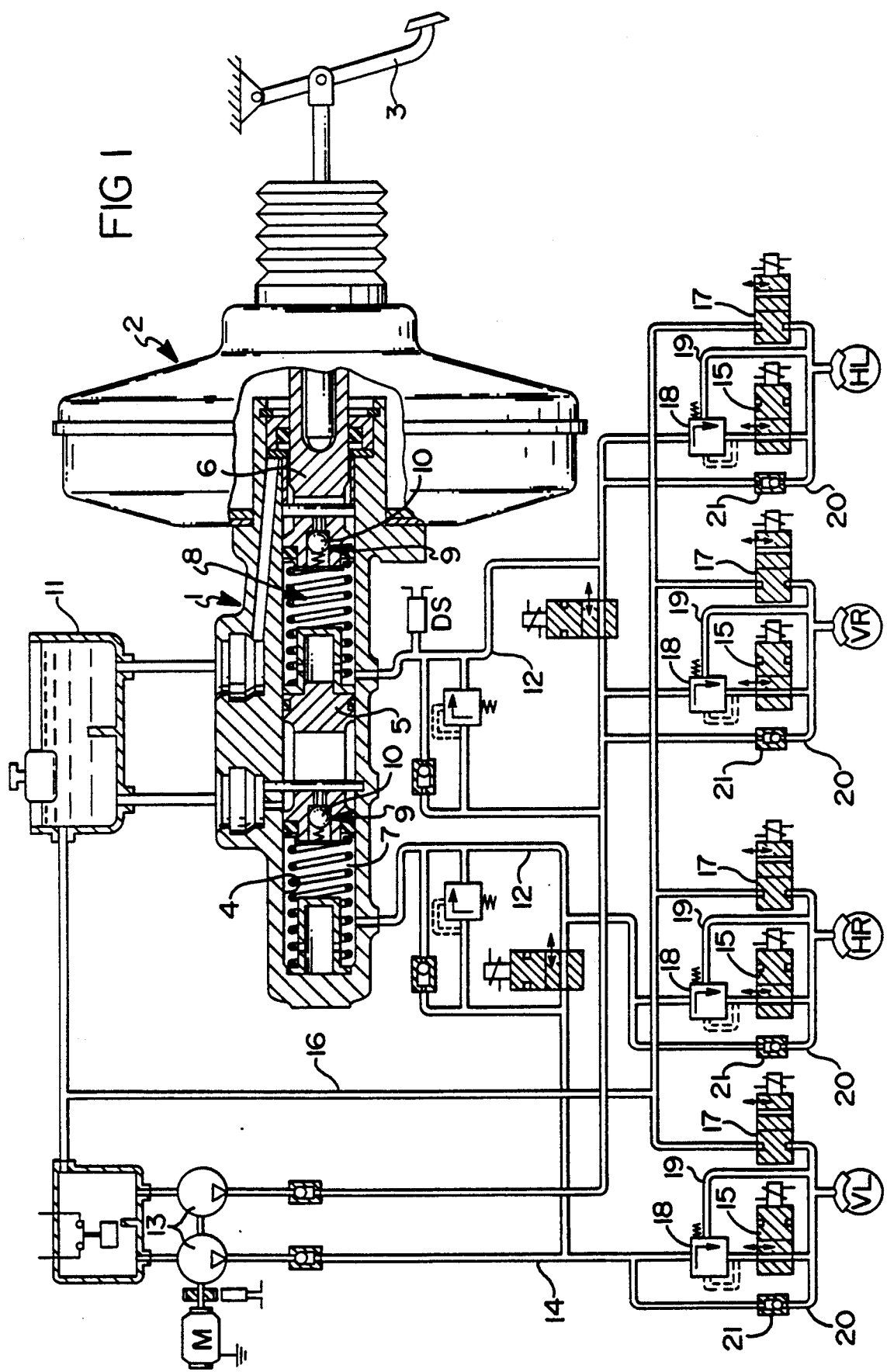
FIG. 1 is a hydraulic system diagram of the brake system, with the master cylinder being illustrated in a sectional view.

The hydraulic brake system comprises a master brake cylinder 1, connected to which is a pneumatic booster 2. The pneumatic booster 2 is actuated by means of a pedal 3. Sealingly guided in the longitudinal bore 4 of the master brake cylinder 1 is a floating piston 5 along with a pushrod piston 6. They confine two working chambers 7 and 8 in bore 4 of the master cylinder 1. Both the push rod piston 6 and the floating piston 5 exhibit a central valve 9, the closure member 10 of which, in the basic position of the piston, is held in spaced relationship from the valve seat by means of a plunger in abutment with a stop fixed to the housing, thereby establishing a connection between the working chambers 7 and 8 and the reservoir 11. Once the driver actuates pedal 3, the pushrod piston 6 with the aid of the pneumatic booster 2 is pushed into the master brake cylinder causing the central valve 9 to close and pressure fluid to be displaced from the working chamber 8 into the connected brake circuit. As a consequence, floating piston 5 also is displaced such that pressure fluid is also displaced from the working chamber 7. Both working chambers, respectively through a brake conduit 12, are in communication with the wheel brakes of the automotive vehicle designated by a letter combination, with the following abbreviations: V for frontside, H for rearside, L for leftside and R for rightside.

The brake system of FIG. 1 further comprises a dual pump 13 actuated by a motor M. The pumps deliver from the reservoir 11, respectively by way of one pressure conduit 14, into the brake circuits 12. Connected into the brake conduit 12 and the branch conduits thereof, respectively, leading to the wheel brakes, is an inlet valve 15 which is electromagnetically operated and open in the basic position. The wheel brakes, through a return conduit 16, are in communication with the reservoir 11, with respectively outlet valve 17 being provided in the return conduits and the branch conduits, respectively, which outlet valve is electromagnetically actuated but closed in its deenergized condition. Provided above the inlet valves 15, that is between the inlet valve 15 and the pump 13 or the master brake cylinder 1, respectively, is respectively one differential pressure limiter 18, the control conduit 19 of which is in direct communication with the respective wheel brake. Connected in parallel to the inlet valve 15 and the differential pressure limiter 18, in a bypass conduit 20, is a check valve 21 closed against flow into the wheel brake.

Figure 2:
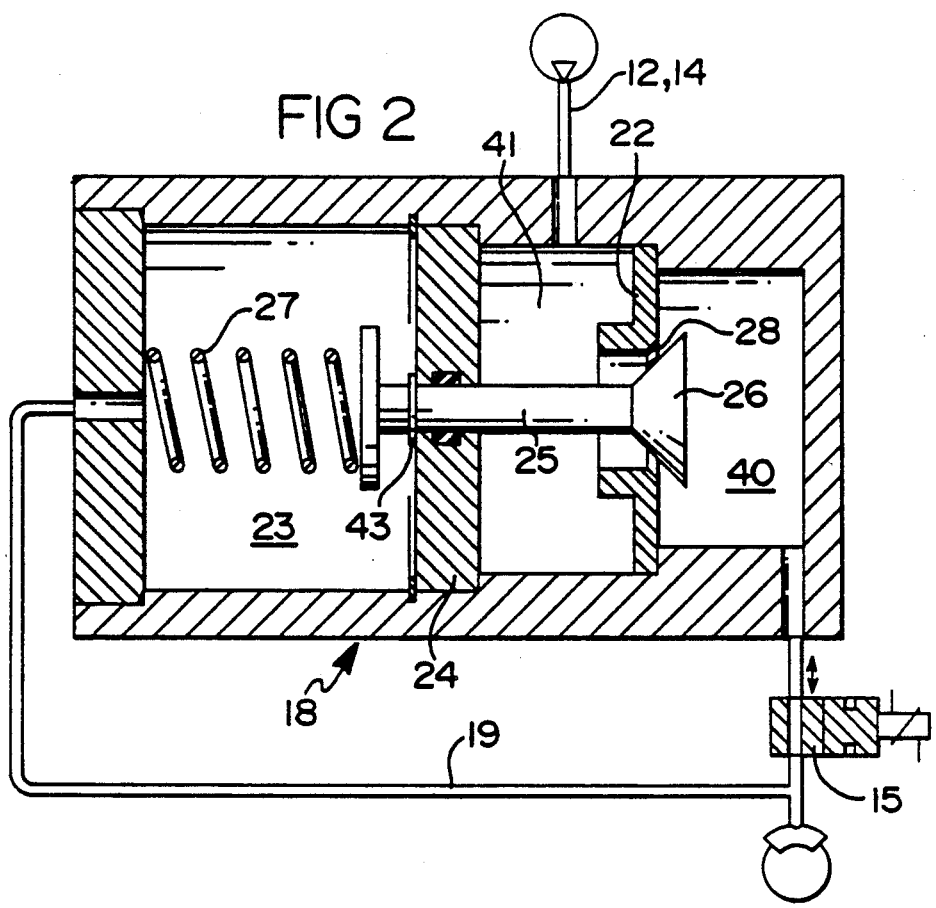
FIG. 2 is an enlarged sectional view of an advantageous embodiment of the differential pressure limiter.

The differential pressure limiter is illustrated in greater detail in FIG. 2. It consists of a housing comprising three chambers in side-by-side relationship. At the right-hand side of the drawing, the outlet chamber 410 is shown which, through the inlet valve 15, is in communication with the wheel brake.

Located to the left of the outlet chamber 40 is the inlet chamber 41 in communication with the pressure conduit 14 and the brake conduit 12, respectively. Chambers 40 and 41 are separated from one another by a partition 22, with a central hole in the wall 22 forming the valve passage. Located to the left of the inlet chamber 41 is the control chamber 23 which, through the control conduit 19, is in direct communication with the wheel brake. A valve shaft 25 is sealingly passed through the wall 24 between inlet chamber 41 and control chamber 23, protruding through the central hole of wall 22 into the outlet chamber 40 to pass over into a valve closure body 26 having a conical seat. Disposed in the control chamber 23 is a valve spring 27 which, on the one hand, is supported on the housing bottom and, on the other hand, on the valve stem 25. Spring 27 forces the shaft 25 against a stop 43, with the valve body 26, in the basic position defined by stop 43, being kept in spaced relationship from valve seat 28 thereby providing free passage between inlet chamber 41 and outlet chamber 40.

Figure 3:
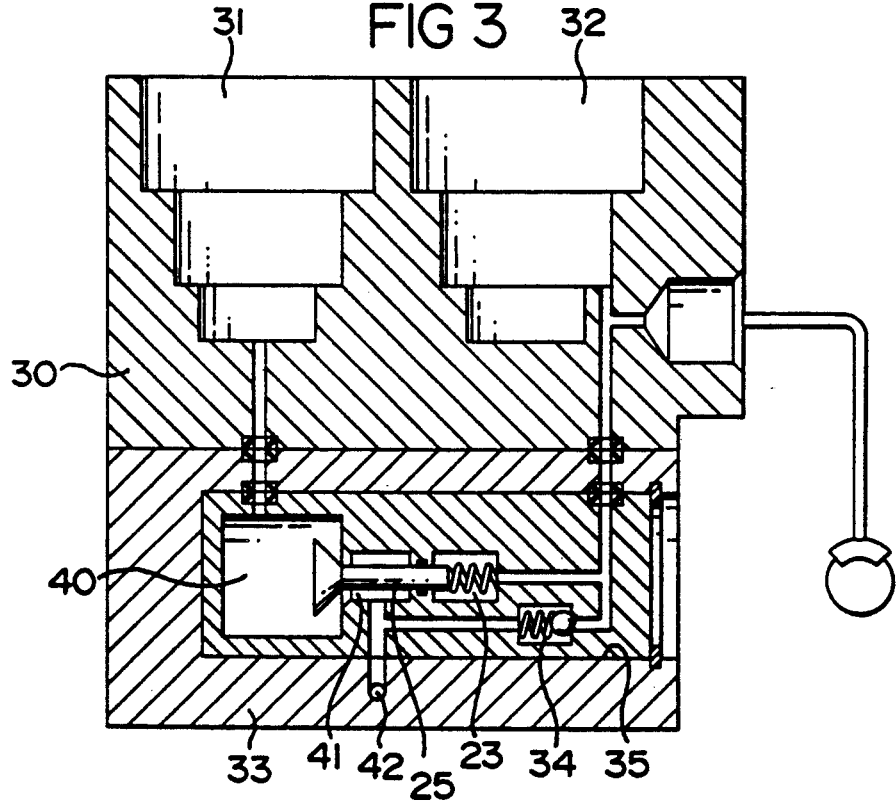
FIG. 3 is an enlarged sectional view of the arrangement of the differential pressure limiter on a valve block; and, FIG. 4 is an enlarged sectional view of another advantageous embodiment of the differential pressure limiter with an integrated check valve.

Advantageously, the housing of the differential pressure limiter can be connected to the valve block 30 for the inlet valve 15 and the outlet valve 17 as illustrated in FIG. 3. The upper portion of the drawing shows the block 30 with the receiving ports 31, 32 for the inlet and outlet valves. Located below the valve block, on the side opposite the receiving ports 31, 32, is the housing 33 for the differential pressure limiter.

Here, chambers 23, 40 and 41 as well as the check valve 34 are disposed. The latter may replace the check valve 21 as shown in FIG. 1.

The operation of th esystem is as follows: In the basic position, all parts take the position as shown, and the valves are in the illustrated switching positions. By actuating the pedal 3, pressure fluid is displaced from the working chambers 7 and 8 into the brake conduit 12 through the open valves 15 to the wheel brakes thereby causing a pressure to develop in the brake circuits resulting in that the brakes are applied and the vehicle is delayed. The pressure differential limiter remains open as the same pressure prevails both in the control chamber 23 and in the outlet chamber 40. Based on the effect of the pressures, hence, the valve shaft 25 is forced-balanced so that spring 27 keeps valve 26, 28 open.

If the pressure in the brake conduits is raised by increasing the pedal force to such an extent that the wheels tend to lock, the anti-locking mode will commence. Motor M of pumps 13 will be actuated and inlet valve 15 closed. Now, the pressure in the pressure conduit and in the brake circuit, respectively, can be raised without causing the pressure in the wheel brakes to equally rise. As the pressure in the outlet chamber 40 now exceeds the pressure prevailing in the control chamber 23, a force acting against the spring force acts upon the shaft 25 causing the shaft to be displaced to the left as shown in FIG. 2. The valve body 26 is thereby mounted onto the valve seat 28 and the connection between the inlet chamber 41 and the outlet chamber 40 blocked. The spring bias can, for example, be adjusted such that in case of a pressure difference of, for example 25 bar between the outlet chamber 40 and the control chamber 23, the valve is closed. By opening the outlet valve 17, the pressure in the wheel brakes can be further decreased. Once the inlet valve 15 is opened to ensure a renewed pressure rise in the wheel brakes, the pressures in the outlet chamber 40 and the control chamber 23 will re-equalize such that once the pressure difference again reaches 25 bar, the valve passage of the differential pressure limiter is opened to cause pressure fluid to flow from the pump into the wheel brakes. What is essential is that due to the differential pressure limiter on the inlet valve 15, a defined and constant pressure exceeds the pressure corresponding to the force of the valve spring 27.

Figure 4:
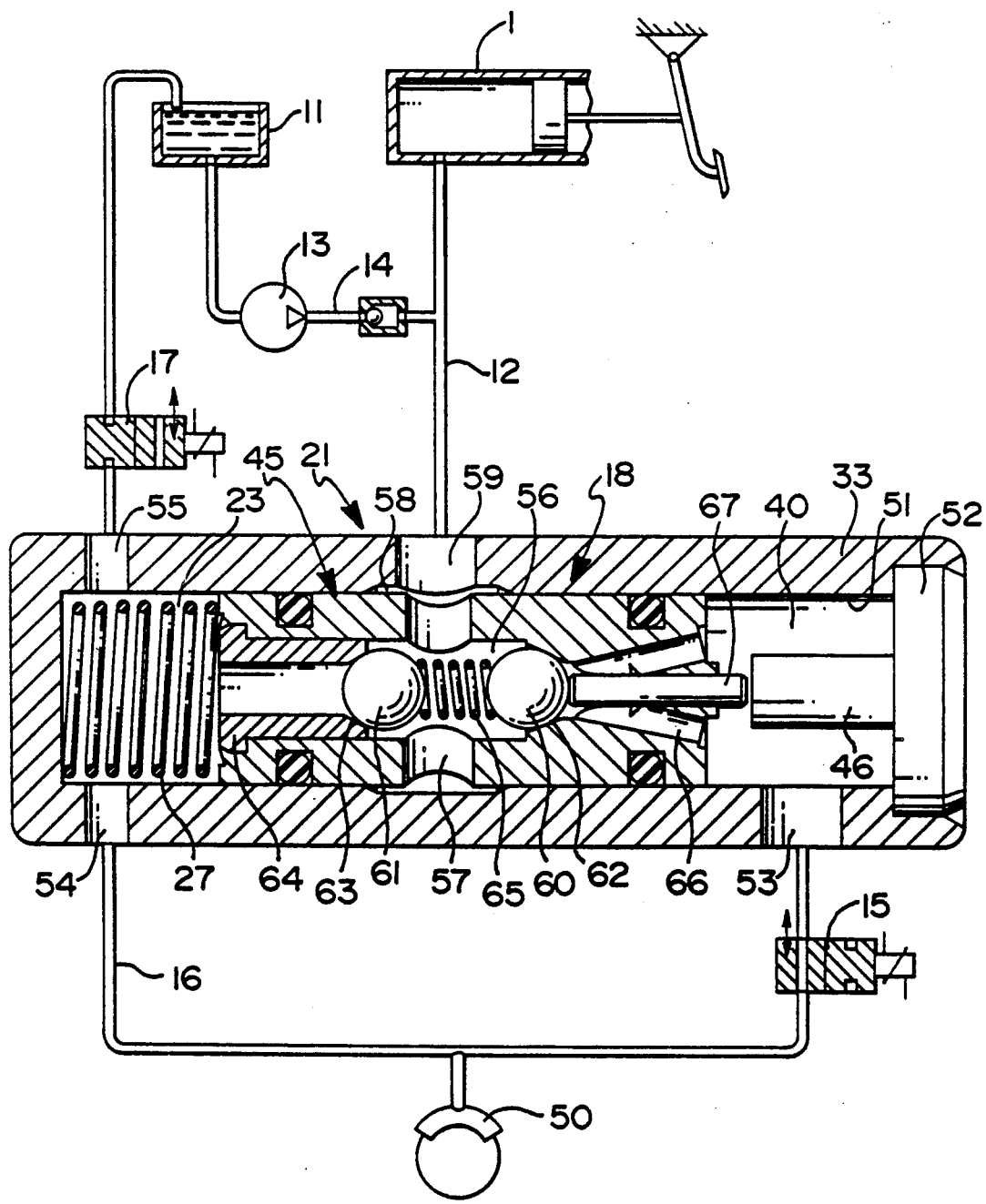

The embodiment according to FIG. 4 will now be described. The circuit as shown corresponds to FIG. 1, with the differentgial pressure limiter 18 and the check valve 21 being disposed in a common valve housing 33. The valve housing 33 exhibits a longitudinal port 51 in which is sealingly guided a valve body 45. The valve body 45, with the one front side thereof, confines the outlet chamber 40 and, with the other front side thereof, confines the control chamber 23. The control chamber 23 is confined by the bottom of the valve housing 33 while the outlet chamber 40 is sealed against the atmosphere by a closure plug 52. Connected to the outlet chamber 40, through a first connection 53, is wheel brake 50, with the inlet valve 15 being disposed in the conduit section between the connection 52=3 and the wheel brake 50. The control chamber 23, through a partial section of the return conduit 16 coupled to the second connection 54, is in direct communication with the wheel brake 50. The outlet chamber 23 exhibits another third connection 55 connected to which is the reservoir 11. Disposed in the partial section of the return conduit 10 between the third connection 55 and the reservoir 11 is the outlet valve 17. The valve body 45 exhibits a central chamber 56 which, through transverse ports 57, is in communication with an annular groove 58 in the valve housing 33. A fourth connection 59 terminates in the annular groove 58 and is in communication with the pump 13 and the master brake cylinder 1.

Disposed in the central chamber are a first valve ball 60 and a second valve ball 61. The first valve ball 60 pertains to the differential pressure limiter 18 while the second valve ball 61 pertains to the check valve 21. The valve balls are respectively in abutment with the valve seats 62, 63 facing the central chamber 21. The first valve seat 62 is associated to the differential pressure limiter 18 and the second valve seat 63 is associated to the check valve 21. The first valve seat is formed directly on the valve body 45 while the second valve seat 63 is formed on a sleeve 64 which, in the axial direction, in inserted into the valve body 45. A holding spring 65 is disposed between the valve balls 60, 61 forcing them onto the respectively associated valve seats. The connection between the central chamber 56 and the control chamber 23 is established trough the longitudinal channel within the sleeve 64. Channels 66 are provided to connect the central chamber 56 to the outlet chamber 40. These channels extend in oblique relationship to the longitudinal axis of the valve body 45. A plunger 67 is axially guided in the valve body 45 and is in abutment with the first valve ball 60, protruding into the outlet chamber 40 in opposite relationship with a stop 46 formed on closure plug 17.

The system shown in the drawing operates according to the following pattern: The drawing shows the blocked position of the differential pressure limiter 18. In the basic position, the control spring 27 disposed in the control chamber 23 and supported, on the one hand, on the housing and, on the other hand, on the valve body 45, foreces the same to the right as shown in the drawing, thereby causing plunger 67 to abut stop 46, lifting the first valve ball 60 from its valve seat 62 so that a pressure fluid connection is established between the fourth connection 59 and the first connection 53 through the annular groove 58, the transverse port 57, the inlet chamber 56, the passageways 66 and the outlet chamber 40. The pressure fluid from the master brake cylinder 1, in this manner, is passed into the wheel brake 50. In the event that the wheels tends to lock, the systems switches into the anti-locking mode, that is the drive of the pump 13 is actuated and valves 15 and 17 are so switched that pressure fluid is alternately supplied to and discharged from the wheel brake thereby causing the pressure in the wheel brake to adjust itself to a value in harmony with the transferable forces between tires and road.

As long as the system is still in the normal brake mode, the pressures in chamber 40 and 23 are identical as the inlet valve 15 is opened. Only the force of the control spring 27 that acts upon the valve body 45 so that the differential pressure limiter 18 is always opened irrespective of the pressure level. In the anti-locking mode, the pressure in the wheel brakes decreases and is always lower than on the fourth connection 59 and the outlet chamber 40, respectively. For, if the pressure in the control chamber 23 would rise beyond the pressure on the connection 59, that is the master brake cylinder pressure, the check valve 21 would open and immediately cause a pressure adjustment. Once the pressure in the control chamber 23 is lower than that in the outlet chamber 40, the valve body 45 is pushed to the left against the force of the control spring 27 so that the first valve ball 60 is seated on the associated sealing seat 62 to block the connection between the master brake cylinder 1 and the first connection 53. If the pressure in the outlet chamber 40 also decreases because the outlet valve 15 is opened, the control spring 27 pushes the valve body 45 back to the right so that the differential pressure limiter 18 opens, and pressure fluid from the pump 13 can flow to the wheel brake cylinder. Practically, a differential pressure adjusts itself on the inlet valve 15 which is determined by the load of spring 27. This measure causes the brake system to operate on a low noise level.

It will now be appreciated by those skilled in the art that the combination of differential pressure limiter 18 and check valve 21 consists of a small number of components easy to process and assemble. The sealing seats can be checked independently of the brake system.

What is claimed is:

1. An anti-locking hydraulic brake system comprising at least one hydraulically operated wheel brake, a brake pedal actuated master cylinder having an outlet, an auxiliary pressure source having an outlet, pressure conduit means connecting said master cylinder and said auxiliary pressure outlets with said wheel brake, an inlet valve provided in said pressure conduit means between said master cylinder and auxiliary pressure source and said wheeel brake, return conduit means between said master cylinder and said auxiliary pressure source and said wheel brake, an outlet valve interposed in said return conduit means, differential pressure limiter means interposed in said pressure conduit means between said auxiliary pressure source and said inlet valve, said differential pressure limiter means includes an inlet connected to said outlet of said master cylinder and said outlet of said auxiliary pressure source by said pressure conduit means, said differential pressure limiting means includes a valve housing, a valve body slidably mounted in said valve housing, a control chamber defined between said valve housing and one side of said valve body, conduit means transmitting the preassure of said wheel brake directly to said control chamber, an outlet chamber defined between said valve housing and the other end of said valve body, said outlet chamber connected to said wheel brake via said inlet valve by said pressure conduit means;

said differential pressure limiter means further including, valve means controllably connecting said differential pressure limiter means inlet to said outlet chamber, said valve means including a closure member movable relative said valve body and a valve seat formed in said valve body adapted to be sealed by movement of said closure member onto said valve seat, operator means for moving said closure member onto said valve seat in response to development of a predetermined pressure differential between the pressure in said control chamber and said outlet chamber;

a bypass conduit between said inlet valve and said differential pressure limiter means inlet, a check valve in said bypass conduit having a movable closure member and a valve seat cooperating therewith to control communications through said check valve, said closure member movable off said valve seat by pressure in said bypass conduit in the direction toward said differential pressure limiter means inlet;

said check valve seat also carried on said valve body.

2. A brake system according to claim 1, wherein said valve body is formed with a central chamber and with transverse bores communicating said central chamber with said differential pressure limiter means inlet connected to said outlet of said auxiliary pressure source and said outlet of said master cylinder, and wherein said check valve and pressure limiter means closure member comprise first and second valve balls which are located in said central chamber (56).

3. A brake system according to claim 1, wherein said valve seat of said check valve includes a sleeve inserted into said valve body, said sleeve formed with a bore surrounded with said valve seat.

4. A brake system according to claim 1, wherein said operator means includes a control spring disposed within said control chamber, engaging said housing and said one end of said valve body, said control spring forcing said valve body towards said outlet chamber whenever said differential pressure declines below said predetermined level.

5. A brake system according to claim 4, wherein said operator means includes a plunger carried by said valve body and having one end engagable with said second valve ball comprising said differential pressure limiter means closure member a fixed stop and means fixing said stop in said housing engagable with the other end of said plunger upon continued movement of said valve body in said housing towards said outlet chamber, said one end of said plunger extending through said valve seat of said differential pressure limiter means whereby is lifted off said associated valve seat upon movement of said valve body towards said outlet chamber when said differential pressure declines below said predetermined level.

6. A brake system according to claim 5, wherein said valve body is formed with a bore extending into said outlet chamber, and wherein said means fixing said fixed stop fixed in said housing comprises a plug sealing said bore and confining said outlet chamber.

7. A brake system according to claim 4 wherein said first and second valve balls are aligned with each other in said central chamber and further including a spring interposed between and engaging adjacent sides of said first and second balls, said respective valve seats carried on either end of said valve body located on the opposite sides of said first and second valve balls, said spring urging both of said balls onto a respective seats.

8. A brake system according to claim 7 wherein said control chambeer is connected to said central chamber via said check valve seat on said valve body.

* * * * *